United States Patent Office 2,989,548
Patented June 20, 1961

2,989,548
WATER-INSOLUBLE ANTHRAQUINONE DYESTUFFS
Violet Boyd and Charles Hugh Reece, Manchester, England, assignors to Imperial Chemical Industries Limited, Millbank, London, England, a corporation of Great Britain
No Drawing. Filed Jan. 19, 1959, Ser. No. 787,347
Claims priority, application Great Britain Jan. 24, 1958
3 Claims. (Cl. 260—379)

This invention relates to new dyestuffs and more particularly it relates to new water-insoluble dyestuffs of the anthraquinone series.

According to the invention there are provided new water-insoluble dyestuffs of the anthraquinone series containing at least one $\gamma$-bromo-$\beta$-hydroxypropylamino or di($\gamma$-bromo-$\beta$-hydroxypropyl)amino group.

According to a further feature of the invention there is provided a process for the manufacture of the new dyestuffs as hereinbefore defined which comprises treating an anthraquinone compound free from sulphonic and carboxylic acid groups and containing at least one primary amino group with epibromohydrin.

The process of the invention may be conveniently brought about by heating the reactants together in a suitable solvent, for example chlorobenzene, in the presence of an acid catalyst, for example p-toluenesulphonic acid, or if desired an acid solvent for example acetic acid may be used, adding a liquid, for example water or methanol, which is miscible with the solvent but in which the dyestuff is insoluble, filtering off the dyestuff and drying, or if desired the dyestuff may be isolated by removing the solvent by distillation.

The primary amino group or groups present in the water-insoluble anthraquinone compounds, which are used in the process of the invention, may be either directly attached to the anthraquinone nucleus and/or attached to an arylamino group which is itself attached to the anthraquinone nucleus. When the primary amino group is directly attached to the anthraquinone nucleus then, in general, on reaction with the epibromohydrin, a dyestuff containing a $\gamma$-bromo-$\beta$-hydroxypropylamino group is obtained whereas when the primary amino group is attached to an arylamino group a dyestuff containing a di($\gamma$-bromo-$\beta$-hydroxypropyl)amino group is generally obtained. However when the aminoanthraquinone used in the process of the invention contains at least one amino group directly attached to the anthraquinone nucleus and at least one amino group attached to an arylamino group which is attached to the anthraquinone nucleus then the resulting dyestuff will in general contain only a di($\gamma$-bromo-$\beta$-hydroxypropyl)amino group or groups.

If desired the water-insoluble aminoanthraquinones used in the process of the invention may also contain other substituents, for example alkyl, alkoxy, halogen, nitro, alkylamino, hydroxyalkylamino and hydroxy, provided that such substituents are not in an adjacent position to an amino group which is directly attached to the anthraquinone nucleus. When such a substituent is present in the adjacent position to an amino group, this amino group does not react with the epibromohydrin, for example when 1:4-diamino-2-bromoanthraquinone is reacted with epibromohydrin, the epibromohydrin only reacts with the amino group in the 4-position.

As specific examples of water-insoluble amino anthraquinones which may be used in the process of the invention there may be mentioned 1-aminoanthraquinone,
1:4-diaminoathraquinone,
1-amino-4-$\beta$-hydroxyethylaminoanthraquinone,
1-amino-4-p-aminoanilinoanthraquinone,
1-methylamino-4-p-aminoanilinoanthraquinone.
1-amino-4-hydroxyanthraquinone,
1:4-diamino-2-bromo-anthraquinone,
5-nitro-1:4-diaminoanthraquinone,
1:4:5:8-tetraaminoanthraquinone,
1:4:5-triaminoanthraquinone,
1-$\beta$-bromoethylamino-4-aminoanthraquinone and 1:4-di-(3'-aminoanilino)-anthraquinone.

As specific examples of the new dyestuffs of the invention there may be mentioned 1:4-bis($\gamma$-bromo-$\beta$-hydroxypropylamino)anthraquinone,
1 - $\gamma$ - bromo - $\beta$ - hydroxypropylamino-4-$\beta$-hydroxyethylaminoanthraquinone,
1 - $\gamma$-bromo-$\beta$-hydroxypropylamino-4-methylaminoanthraquinone and 1 - amino - 4 - $\gamma$ - bromo-$\beta$-hydroxypropylamino-2-bromoanthraquinone.

The new dyestuffs of the invention may be dispersed by milling them with water and a dispersing agent, for example sodium methylene bis-(naphthalene-2-sulphonate), to form an aqueous paste suitable for dyeing synthetic polyamide materials.

If desired the dispersed aqueous paste of the dyestuffs may be dried to form a re-dispersible powder which may be obtained in a non-dusting form by any of the processes known for forming non-dusting powders.

The new dyestuffs of the invention have very good affinity for synthetic polyamide materials which they dye in red, purple and blue shades possessing much better fastness to washing than dyeings similarly obtained from the corresponding dyestuffs obtained by reacting the same aminoanthraquinones with epichlorohydrin.

The new dyestuffs of the invention may also be used for dyeing materials comprising acetate rayon, cellulose triacetate and synthetic polymers for example polyethyleneterephthalate, but when dyeing such materials it is preferred to treat the materials either before, during or after the application of the dyestuffs with an amine, phenol or thiophenol, whereby red, purple and blue shades are obtained possessing excellent fastness to washing.

The invention is illustrated but not limited by the following examples in which the parts are by weight:

*Example 1*

To a suspension of 142.8 parts of 1:4-diaminoanthraquinone in 130 parts of acetic acid and 25 parts of water at 20° C., there are added, with stirring, 70 parts of epibromohydrin. The mixture is heated to 80° C., 176.6 parts of epibromohydrin are added gradually over 3 hours and the mixture is then stirred for a further 4 hours at 80° C. The mixture is then cooled to 20° C., 45 parts of acetic acid and 250 parts of water are added and the dyestuff which is precipitated is filtered off, washed with a mixture of 100 parts of acetic acid and 500 parts of water, and dried.

When dispersed in water, the dyestuff dyes polyamide fibres in bright reddish-blue shades having much better fastness to washing than a similar dyeing obtained from the dyestuff obtained by reacting 1:4-diaminoanthraquinone with epichlorohydrin.

*Example 2*

In place of the 142.8 parts of 1:4-diaminoanthraquinone used in Example 1 there are used 254 parts of 1-amino-4-$\beta$-hydroxyethylaminoanthraquinone. The 1 - $\gamma$-bromo - $\beta$ - hydroxypropylamino-4-$\beta$-hydroxyethylaminoanthraquinone so obtained, when dispersed in water, dyes nylon in a reddish-blue shade having much better fastness to washing than a similar dyeing obtained from 1-$\gamma$-chloro-$\beta$ - hydroxypropylamino - 4 - $\beta$-hydroxyethylaminoanthraquinone.

Example 3

A mixture of 32.9 parts of 1-amino-4-(4'-aminoanilino)-anthraquinone, 17.5 parts of epibromohydrin, 21.6 parts of acetic acid and 4 parts of water is stirred at a temperature of 80° C. and 51 parts of epibromohydrin are then added during three hours. The mixture is then stirred for a further 4 hours at 80° C. A mixture of 15 parts of acetic acid and 80 parts of water is then added and the mixture so obtained is cooled to 20° C. The dyestuff which is precipitated is filtered off, washed with water and dried.

The dyestuff so obtained, when dispersed in aqueous medium, dyes polyamide fibres in bluish-green shades possessing excellent fastness to washing.

Example 4

A mixture of 23.8 parts of 1:4-diaminoanthraquinone, 250 parts of chlorobenzene and 110 parts of epibromohydrin is stirred at a temperature of 95° C., a solution of 5 parts of p-toluene sulphonic acid in 50 parts of methanol is then added during 4 hours and the mixture is stirred for a further 16 hours at 90° C. The mixture is then steam distilled and the residual solid is filtered off, washed with water and dried at 40° C.

The dyestuff so obtained, when dispersed in aqueous medium, dyes polyamide fibres in bright reddish-blue shades possessing excellent fastness to washing.

Example 5

In place of the 32.9 parts of 1-amino-4-(4'-aminoanilino)-anthraquinone used in Example 3 there are used 14 parts of 1-amino-4-isopropylaminoanthraquinone. The dyestuff so obtained, when dispersed in aqueous medium, dyes polyamide fibres in bright blue shades possessing excellent fastness to washing.

Example 6

In place of the 142.8 parts of 1:4-diaminoanthraquinone used in Example 1, there are used 79.5 parts of 1:4:5:8-tetraaminoanthraquinone. The dyestuff so obtained, when dispersed in aqueous medium, dyes polyamide fibres in greenish-blue shades possessing excellent fastness to washing.

Example 7

In place of the 142.8 parts of 1:4-diaminoanthraquinone used in Example 1 there are used 302.4 parts of 1-methylamino-4-aminoanthraquinone.

The dyestuff so obtained, when dispersed in aqueous medium, dyes polyamide fibres in reddish-blue shades possessing excellent fastness to washing.

Example 8

In place of the 142.8 parts of 1:4-diaminoanthraquinone used in Example 1 there are used 190.2 parts of 1:4-diamino-2-bromoanthraquinone.

The dyestuff so obtained, when dispersed in aqueous medium, dyes polyamide fibres in reddish-blue shades possessing excellent fastness to washing.

Example 9

In place of the 142.8 parts of 1:4-diaminoanthraquinone used in Example 1 there are used 360.6 parts of 1-β-chloroethylamino-4-aminoanthraquinone.

The dyestuff so obtained, when dispersed in aqueous medium, dyes polyamide fibres in reddish-blue shades possessing excellent fastness to washing.

Example 10

In place of the 142.8 parts of 1:4-diaminoanthraquinone used in Example 1 there are used 414 parts of 1-β-bromoethylamino-4-aminoanthraquinone.

The dyestuff so obtained, when dispersed in aqueous medium, dyes polyamide fibres in reddish-blue shades possessing excellent fastness to washing.

Example 11

In place of the 142.8 parts of 1:4-diaminoanthraquinone used in Example 1 there are used 205.8 parts of 1-methylamino-4-(4'-aminoanilino)anthraquinone.

The dyestuff so obtained, when dispersed in aqueous medium, dyes polyamide fibres in bluish-green shades possessing excellent fastness to washing.

What we claim is:

1. Water-insoluble anthraquinone dyestuffs consisting essentially of a single anthraquinone group free from water-solubilizing substituents and having at least one radical selected from the class consisting of γ-bromo-β-hydroxypropylamino and (γ - bromo - β - hydroxypropylamino)phenylamino radicals, each of which is directly attached to a carbon atom of the said anthraquinone nucleus.

2. 1:4 - di(γ - bromo - β-hydroxypropylamino)-anthraquinone.

3. 1-γ-bromo-β-hydroxypropylamino-4-β-hydroxyethylaminoanthraquinone.

References Cited in the file of this patent

UNITED STATES PATENTS

| | | |
|---|---|---|
| 1,854,460 | Dreyfus | Apr. 19, 1932 |
| 2,364,033 | Woodward | Nov. 28, 1944 |

FOREIGN PATENTS

| | | |
|---|---|---|
| 11,930 | Great Britain | Feb. 10, 1910 |
| 201,289 | Switzerland | Feb. 1, 1939 |
| 218,571 | Germany | Feb. 4, 1910 |
| 567,287 | Germany | Dec. 30, 1932 |
| 638,834 | Germany | Nov. 23, 1936 |
| 749,257 | Germany | Dec. 4, 1944 |